United States Patent
Fukuoka

(10) Patent No.: US 11,415,735 B2
(45) Date of Patent: Aug. 16, 2022

(54) LIQUID CRYSTAL DISPLAY DEVICE

(71) Applicant: Japan Display Inc., Tokyo (JP)

(72) Inventor: Nobuko Fukuoka, Tokyo (JP)

(73) Assignee: JAPAN DISPLAY INC., Tokyo (JP)

(*) Notice: Subject to any disclaimer, the term of this patent is extended or adjusted under 35 U.S.C. 154(b) by 0 days.

(21) Appl. No.: 17/375,015

(22) Filed: Jul. 14, 2021

(65) Prior Publication Data

US 2021/0341663 A1 Nov. 4, 2021

Related U.S. Application Data

(63) Continuation of application No. PCT/JP2019/047665, filed on Dec. 5, 2019.

(30) Foreign Application Priority Data

Jan. 16, 2019 (JP) .............................. JP2019-004958

(51) Int. Cl.
*G02F 1/1339* (2006.01)
*F21V 8/00* (2006.01)

(52) U.S. Cl.
CPC .............. *G02B 6/002* (2013.01); *G02B 6/003* (2013.01); *G02F 1/1339* (2013.01)

(58) Field of Classification Search
CPC . G02F 1/1339; G02F 1/133616; G02B 6/003; G02B 6/002
See application file for complete search history.

(56) References Cited

U.S. PATENT DOCUMENTS

2017/0269433 A1 9/2017 Sugiyama et al.
2019/0018184 A1 1/2019 Miyashita et al.

FOREIGN PATENT DOCUMENTS

| JP | 2003-262865 A | 9/2003 |
|----|---------------|--------|
| JP | 2007-33742 A | 2/2007 |
| JP | 2008-186656 A | 8/2008 |
| JP | 2017-167527 A | 9/2017 |
| WO | 2017/122794 A1 | 7/2017 |

OTHER PUBLICATIONS

JP 2008186656 A (Okano Mitsutaka) (Year: 2008).*
International Search Report and Written Opinion dated Feb. 18, 2020, received for PCT Application PCT/JP2019/047665, Filed on Dec. 5, 2019, 11 pages including English Translation.

* cited by examiner

*Primary Examiner* — James A Dudek
(74) *Attorney, Agent, or Firm* — Xsensus LLP

(57) ABSTRACT

According to one embodiment, a display device comprises first and second substrates and a liquid crystal layer. The second substrate has first and second surfaces and a side surface elongated in a first direction. The side surface includes first and second inclined surfaces on which end portions on the first surface side further protrude in a second direction intersecting the first direction than end portions on the second surface side. The first inclined surface is inclined at a first angle to a thickness direction of the second substrate. The second inclined surface is inclined at a second angle smaller than the first angle to the thickness direction.

19 Claims, 8 Drawing Sheets

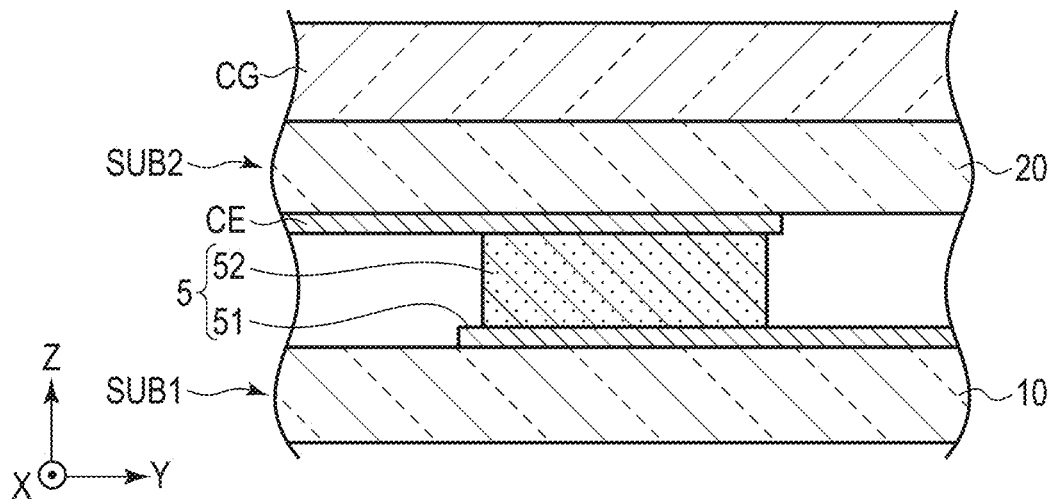
F I G. 8
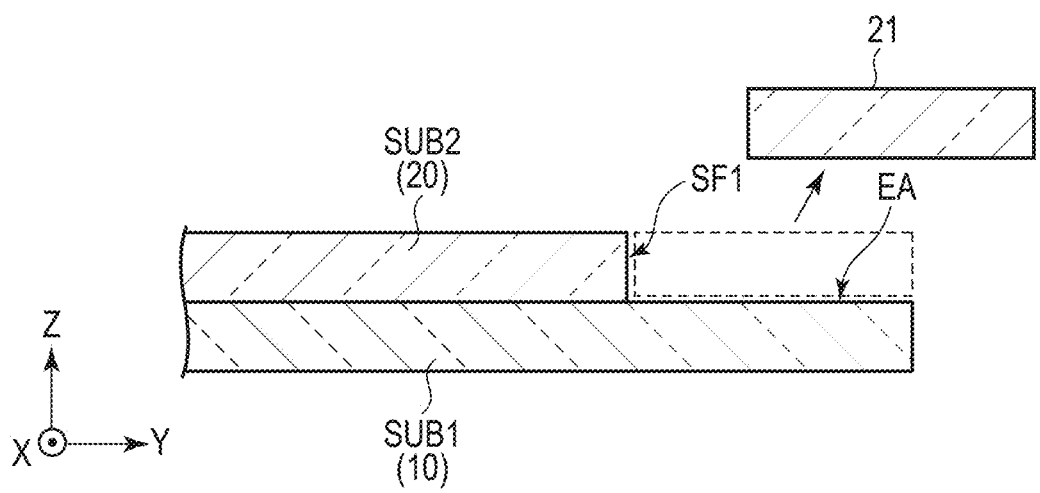
F I G. 9

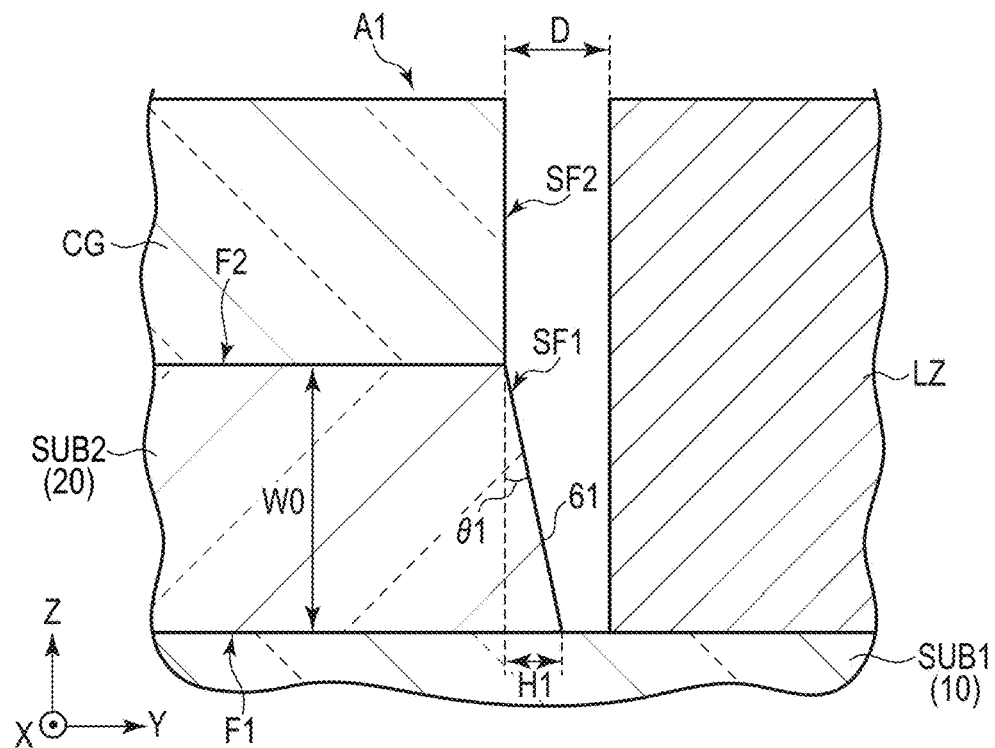
F I G. 10
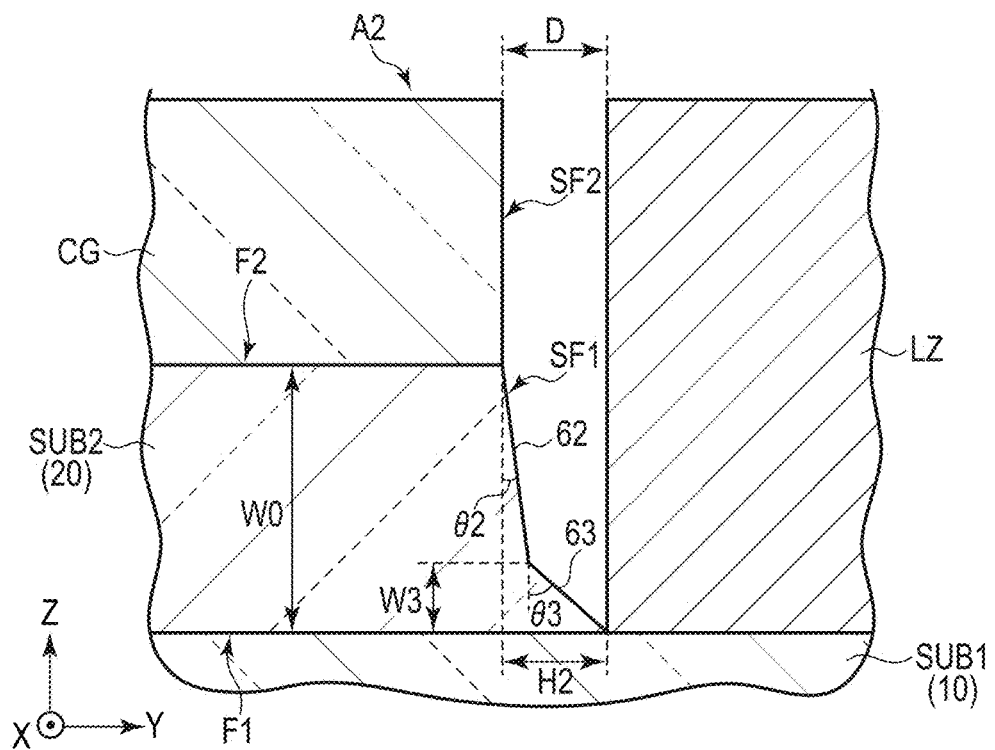
F I G. 11

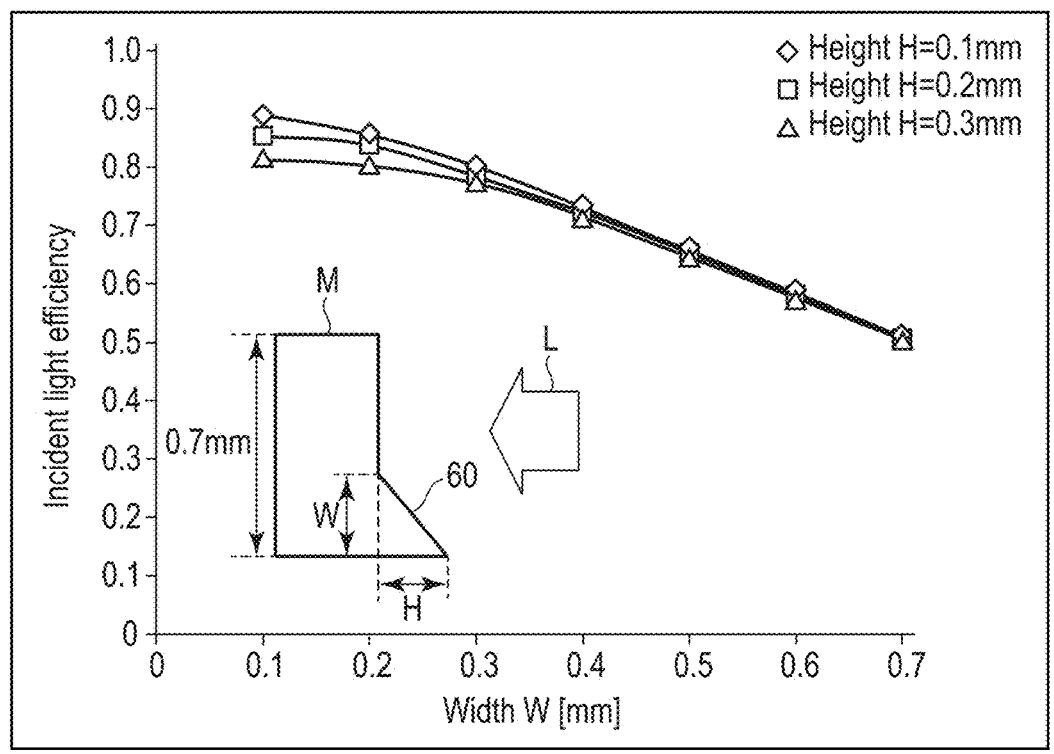
F I G. 12
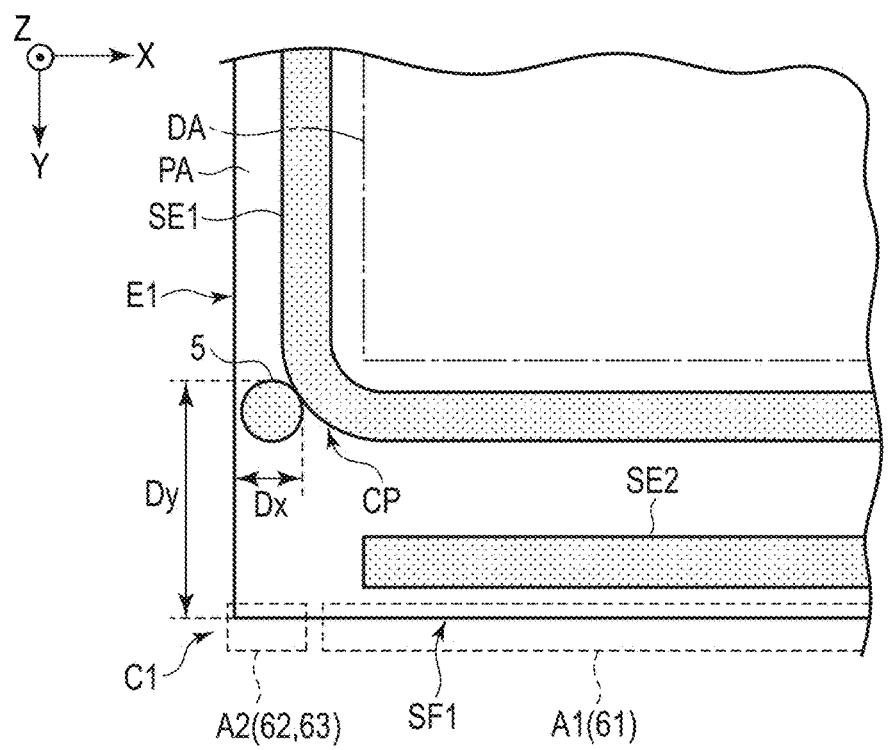
F I G. 13

LIQUID CRYSTAL DISPLAY DEVICE

CROSS-REFERENCE TO RELATED APPLICATIONS

This application is a Continuation Application of PCT Application No. PCT/JP2019/047665 filed Dec. 5, 2019 and based upon and claiming the benefit of priority from Japanese Patent Application No. 2019-004958, filed Jan. 16, 2019, the entire contents of all of which are incorporated herein by reference.

FIELD

Embodiments described herein relate generally to a liquid crystal display device.

BACKGROUND

A liquid crystal display device comprising an array substrate, a counter-substrate opposed to the array substrate, and a liquid crystal layer arranged between these substrates is known. In a general transmissive liquid crystal display device, a backlight serving as a surface light source is arranged on a back surface side of the array substrate.

A light source that emits light for display may be arranged so as to apply light to a side surface of the array substrate or the counter-substrate. In such a configuration, the light from the light source is made incident on the side surface of the array substrate or the counter-substrate and propagates through these substrates. The incident light efficiency on the side surface is affected by the shape of the side surface.

BRIEF DESCRIPTION OF THE DRAWINGS

FIG. 8 is a schematic cross-sectional view showing a connection structure according to the first embodiment.

FIG. 9 is a cross-sectional view schematically showing an example of a manufacturing process of the liquid crystal display device according to the first embodiment.

FIG. 10 is a schematic cross-sectional view showing a first region (A1) shown in FIG. 7.

FIG. 11 is a schematic cross-sectional view showing a second region (A2) shown in FIG. 7.

FIG. 12 is a graph showing a result of analyzing an incident light efficiency on a side surface of a substrate.

FIG. 13 is an enlarged plan view showing a vicinity of a corner portion of a second substrate (SUB2) in FIG. 7.

DETAILED DESCRIPTION

Figure 1:
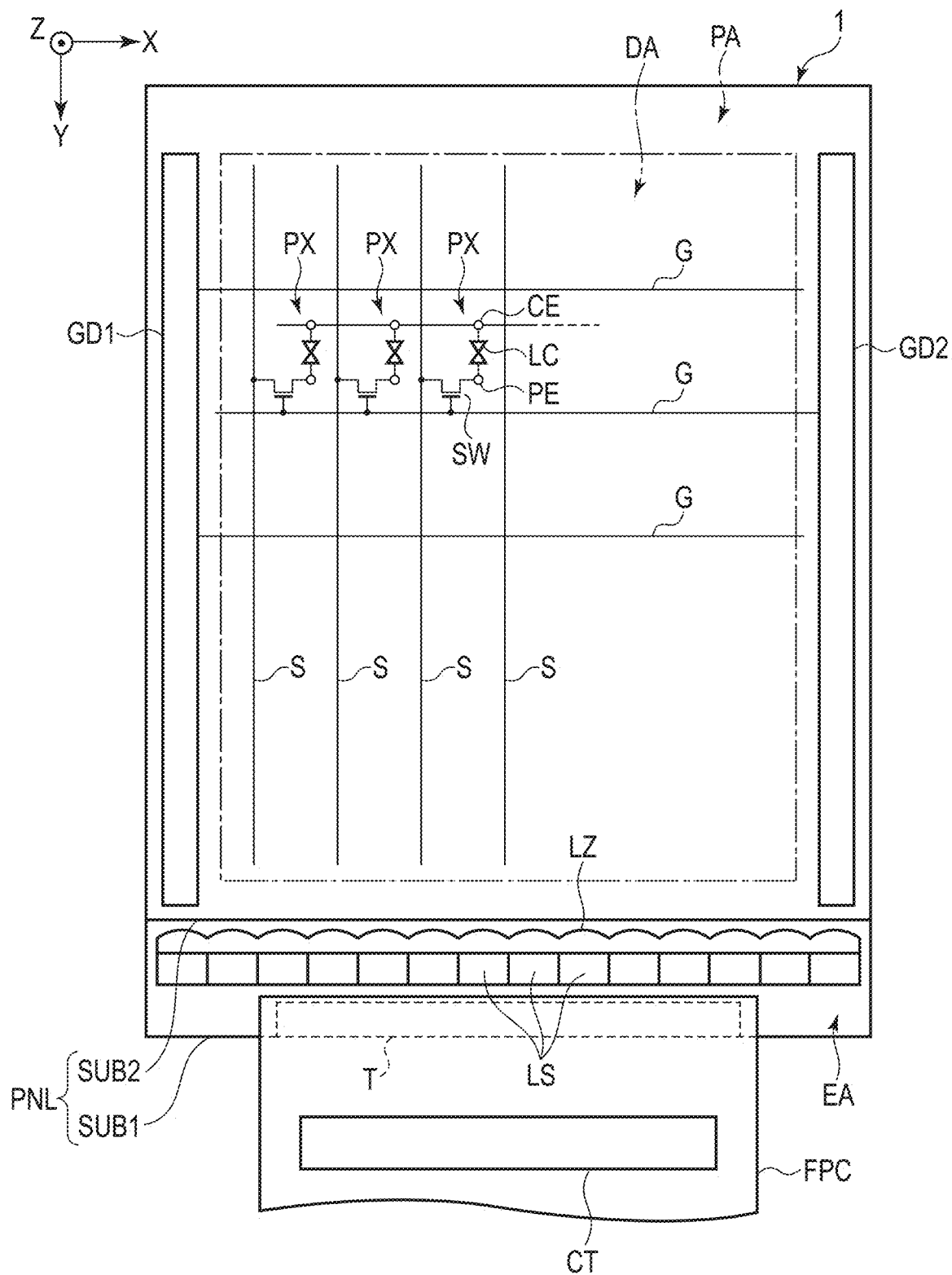
FIG. 1 is a plan view showing a configuration example of a liquid crystal display device according to a first embodiment.

In general, according to one embodiment, a display device comprises a first substrate, a second substrate, and a liquid crystal layer. The second substrate has a first surface opposed to the first substrate, a second surface opposite to the first surface, and a side surface elongated in a first direction. The liquid crystal layer is arranged between the first substrate and the second substrate. The side surface includes a first inclined surface and a second inclined surface on which end portions on the first surface side further protrude in a second direction intersecting the first direction than end portions on the second surface side. The first inclined surface is inclined at a first angle to a thickness direction of the second substrate. The second inclined surface is inclined at a second angle smaller than the first angle to the thickness direction.

According to such a configuration, a liquid crystal display device having an excellent incident efficiency of the light from the light source can be obtained.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the embodiments are illustrated schematically in the drawings, rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In each of the embodiments, a translucent liquid crystal display device capable of visually recognizing the background is disclosed as an example of the display device. Incidentally, each embodiment does not prevent application of individual technical ideas disclosed in each embodiment to other types of display devices. As the other types of display devices, for example, a transmissive liquid crystal display device that displays an image by using light of a backlight, a reflective liquid crystal display device that displays an image by using external light, a self-luminous display device comprising an organic electroluminescent display element or a light emitting diode (LED) display element, an electronic paper display device comprising an electrophoretic element, a display device to which the micro-electromechanical systems (MEMS) is applied, a display device to which the electrochromism is applied or the like is assumed.

First Embodiment

FIG. 1 is a plan view showing a configuration example of a liquid crystal display device 1 (hereinafter referred to as display device 1) according to a first embodiment. In the figure, a first direction X, a second direction Y and a third direction Z intersect each other. In the present embodiment, the first direction X, the second direction Y, and the third direction Z are orthogonal to each other, but may intersect at an angle other than 90 degrees.

The display device 1 comprises a display panel PNL, a plurality of light sources LS, a flexible circuit board FPC, and a controller CT. The display panel PNL comprises a first substrate SUB1 (array substrate), a second substrate SUB2 (counter-substrate), a liquid crystal layer LC sealed between these substrates.

In the example of FIG. 1, the first substrate SUB1 includes an extending region EA that extends in the second direction Y beyond a lower end in the figure (i.e., side surface SF1 to be described later) of the second substrate SUB2. The extending region EA includes a terminal T for external connection. A flexible printed circuit FPC is connected to the terminal T. Incidentally, the shape of the first substrate SUB1 and the second substrate SUB2 is not limited to the rectangular shape.

The display panel PNL includes a display region DA on which an image is displayed and a peripheral region PA located around the display region DA. The peripheral region PA includes an extending region EA. In the display region DA, the first substrate SUB1 comprises a plurality of scanning lines G and a plurality of signal lines S. The plurality of scanning lines G extend in the first direction X and are arranged in the second direction Y. The plurality of signal lines S extend in the second direction Y and are arranged in the first direction X.

The display region DA includes a plurality of pixels PX arrayed in a matrix. The first substrate SUB1 comprises a pixel electrode PE and a switching element SW arranged in each of the pixels PX. The second substrate SUB2 comprises a common electrode CE extending across the plurality of pixels PX. A common voltage is applied to the common electrode CE.

The display panel PNL comprises a first scanning driver GD1 and a second scanning driver GD2 in the peripheral region PA. The scanning lines G extend to the peripheral region PA to be connected to the first scanning driver GD1 or the second scanning driver GD2. The signal lines S are connected to the terminal T.

The plurality of light sources LS are arranged in the extending region EA. For example, the plurality of light sources LS include an LED that emits red light, an LED that emits green light, and an LED that emits blue light. However, the light source LS may comprise LEDs emitting colors other than red, green, and blue. In FIG. 1, the plurality of light sources LS are arranged in the first direction X, but at least some of them may be arranged in the third direction Z.

As shown in FIG. 1, a lens LZ may be arranged between each light source LS and the second substrate SUB2. The lens LZ has, for example, a plurality of curved surfaces corresponding to the respective light sources LS and controls the width in the second direction Y of the light emitted from each light source LS.

The controller CT controls the first scanning driver GD1, the second scanning driver GD2, and the light source LS, and supplies video signals to the respective signal lines S. In the example shown in FIG. 1, the controller CT is mounted on the first flexible printed circuit FPC, but the controller CT may be mounted on the other member.

Figure 2:
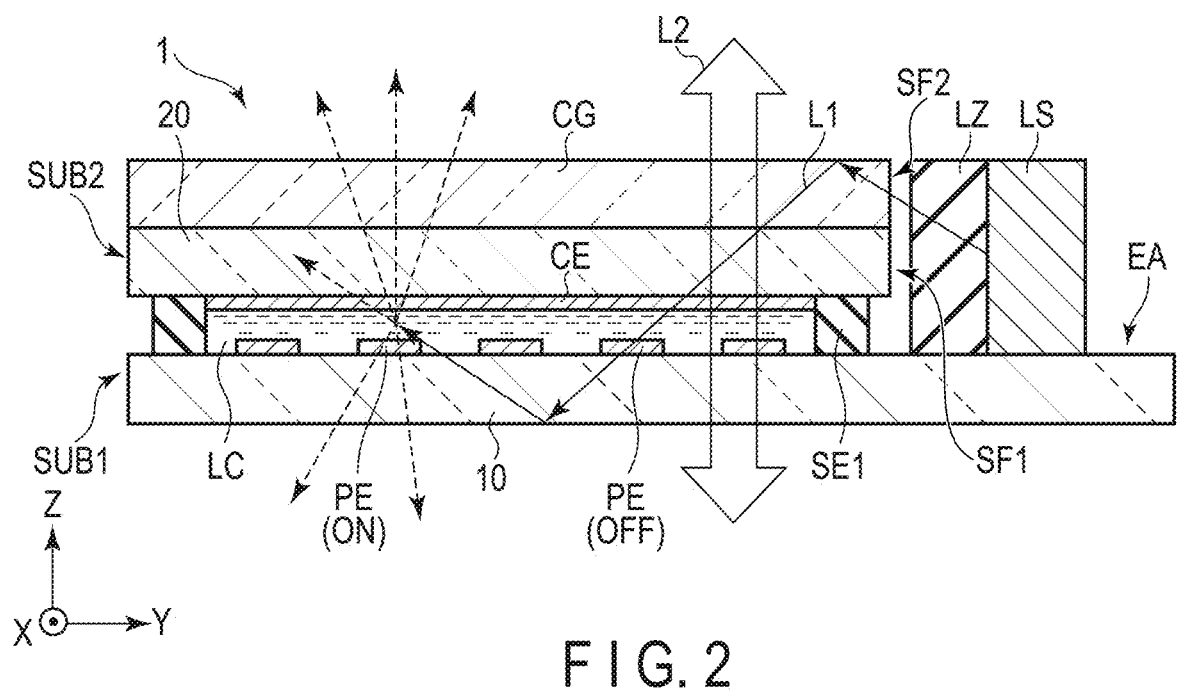
FIG. 2 is a schematic cross-sectional view showing the liquid crystal display device according to the first embodiment.

FIG. 2 is a schematic cross-sectional view showing the display device 1 shown in FIG. 1. The first substrate SUB1 comprises a first base 10 and pixel electrodes PE. The second substrate SUB2 comprises a second base 20 and the common electrode CE. The pixel electrode PE is arranged in each pixel above the first base 10. The common electrode CE is arranged under the second base 20. In the present embodiment, the first base 10 and the second base 20 are formed of glass. However, the first base 10 and the second base 10 can also be formed of a transparent resin material. The pixel electrodes PE and the common electrode CE can be formed of a transparent conductive material such as indium tin oxide (ITO).

The first substrate SUB1 and the second substrate SUB2 are bonded by a frame-shaped first sealing member SE1. The liquid crystal layer LC is arranged between the first substrate SUB1 and the second substrate SUB2, inside the first sealing member SE1. A second sealing member SE2 to be described below may be arranged between the first sealing member SE1 and the light sources LS (see FIG. 7).

A translucent cover member CG is adhered to the second substrate SUB2 via, for example, an adhesive layer. The cover member CG can be formed of, for example, a transparent material such as glass. In FIG. 2, the side surface SF1 of the second substrate SUB2 and the side surface SF2 of the cover member CG are aligned in the third direction Z, but these side surfaces SF1 and SF2 may be displaced from each other.

The extending region EA extends in the second direction Y beyond the side surface SF1 of the second substrate SUB2. The light sources LS and the lens LZ are arranged in the extending region EA and opposed to the side surfaces SF1 and SF2. The light sources LS irradiates the side surfaces SF1 and SF2 with light.

Figure 3:
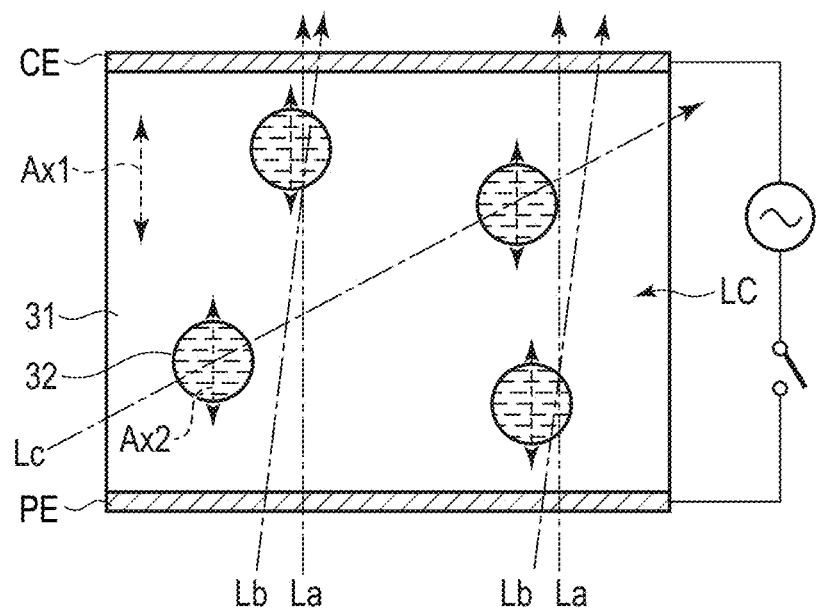
FIG. 3 is a cross-sectional view showing an example of a configuration applicable to a liquid crystal layer according to the first embodiment.
Figure 4:
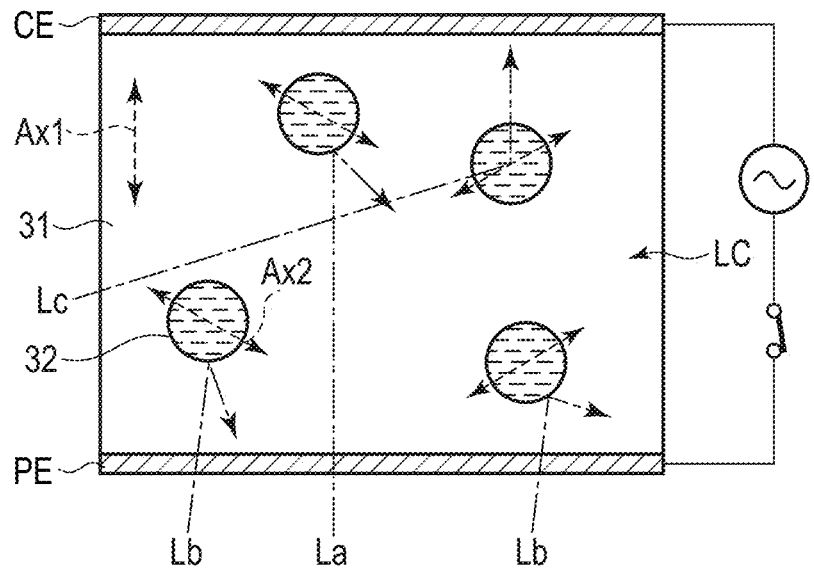
FIG. 4 is a cross-sectional view showing an example of a configuration applicable to the liquid crystal layer according to the first embodiment.

FIG. 3 and FIG. 4 are cross-sectional views showing an example of the structure applicable to the liquid crystal layer LC. The liquid crystal layer LC contains a liquid crystal polymer 31 and liquid crystal molecules 32, which are examples of polymer liquid crystal composition. The liquid crystal polymer 31 and the liquid crystal molecules 32 have equivalent optical anisotropy. Alternatively, the liquid crystal polymer 31 and the liquid crystal molecules 32 have substantially equivalent refractive anisotropy. In addition, the liquid crystal polymer 31 and the liquid crystal molecules 32 are different in the response to the electric field. That is, the response of the liquid crystal polymer 31 to the electric field is slower than the response of the liquid crystal molecules 32 to the electric field.

The example shown in FIG. 3 corresponds to, for example, a transparent state in which no voltage is applied to the liquid crystal layer LC (i.e., a state in which a potential difference between the pixel electrode PE and the common electrode CE is zero). In this state, an optical axis Ax1 of the liquid crystal polymer 31 and an optical axis Ax2 of the liquid crystal molecules 32 are parallel to each other.

As described above, the liquid crystal polymer 31 and the liquid crystal molecules 32 have substantially equivalent refractive anisotropy, and the optical axes Ax1 and Ax2 are parallel to each other. For this reason, there is almost no difference in refractive index between the liquid crystal polymer 31 and the liquid crystal molecules 32 in all directions. Thus, a light beam La parallel to the thickness direction (third direction Z) of the liquid crystal layer LC, and light beams Lb and Lc inclined with respect to the thickness direction are transmitted through the liquid crystal layer LC while hardly scattered.

The example shown in FIG. 4 corresponds to a scattering state in which a voltage is applied to the liquid crystal layer LC (i.e., a state in which a potential difference is formed between the pixel electrode PE and the common electrode CE). As described above, the response of the liquid crystal polymer 31 to the electric field is slower than the response of the liquid crystal molecules 32 to the electric field. For this reason, in the state in which a voltage is applied to the liquid crystal layer LC, the alignment direction of the liquid crystal molecules 32 is changed in accordance with the electric field while the alignment direction of the liquid crystal polymer 31 is hardly changed. For this reason, the optical axis Ax2 is angled to the optical axis Ax1. A large difference in refractive index is thereby caused between the liquid crystal polymer 31 and the liquid crystal molecules 32 in all directions. In this state, the light beams La, Lb, and Lc incident on the liquid crystal layer LC are scattered in the liquid crystal layer LC.

Figure 5:
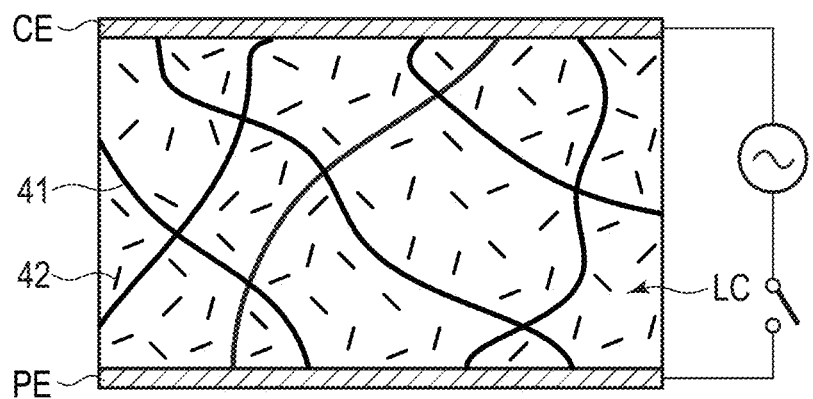
FIG. 5 is a cross-sectional view showing an example of the other configuration applicable to the liquid crystal layer according to the first embodiment.
Figure 6:
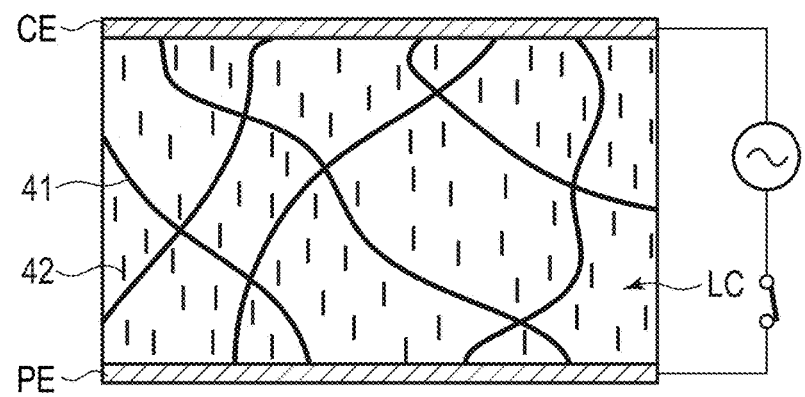
FIG. 6 is a cross-sectional view showing an example of the other configuration applicable to the liquid crystal layer according to the first embodiment.

FIG. 5 and FIG. 6 are cross-sectional views showing another example of the structure applicable to the liquid crystal layer LC. The structure shown in FIG. 5 and FIG. 6 corresponds to a polymer network type liquid crystal in which a polymer fiber structure (polymer network structure) is formed in the liquid crystal layer LC. That is, the liquid crystal layer LC includes polymers 41 formed in a network shape, and liquid crystal molecules 42. In FIG. 5 and FIG. 6, the plurality of polymers 41 are irregularly arranged, but the plurality of polymers 41 may be arranged substantially parallel to the main surface of the first substrate SUB1 (see FIG. 2).

FIG. 5 shows a state where no voltage is applied to the liquid crystal layer LC, and the liquid crystal molecules 42 are arranged irregularly by the action of the polymers 41. In this state, the light incident on the liquid crystal layer LC is scattered. FIG. 6 shows a state in which a voltage is applied to the liquid crystal layer LC, and the liquid crystal molecules 42 are aligned in a predetermined direction. In this state, light is hardly scattered and is transmitted through the liquid crystal layer LC.

As shown in FIG. 2, light L1 emitted from the light sources LS propagates inside the first substrate SUB1 and the second substrate SUB2. For example, when the liquid crystal layer LC having the structure shown in FIG. 3 and FIG. 4 is adopted, the light L1 is hardly scattered in the liquid crystal layer LC, in the vicinity of the pixel electrode PE to which no voltage is applied (OFF in the figure). For this reason, the light L1 hardly leaks from the first substrate SUB1 and the second substrate SUB2. In contrast, the light L1 is scattered in the liquid crystal layer LC, in the vicinity of the pixel electrode PE to which a voltage is applied (ON in the figure). The scattered light is emitted from the first substrate SUB1 and the second substrate SUB2 and is visually recognized as a display image.

In contrast, when the liquid crystal layer LC having the structure shown in FIG. 5 and FIG. 6 is adopted, the light L1 is scattered in the vicinity of the pixel electrode PE to which the voltage is not applied (OFF in the figure), and the light L1 is not scattered in the vicinity of the pixel electrode PE to which the voltage is applied (ON in the figure).

Incidentally, external light L2 incident on the liquid crystal layer LC in the transmissive state is transmitted through the display device 1 while hardly scattered. That is, when the display device 1 is viewed from the second substrate SUB2 side, the background on the first substrate SUB1 side is visible, and when the display device 1 is viewed from the first substrate SUB1 side, the second substrate SUB2 side is visible. The background is visible.

The display device 1 configured as described above can be driven in, for example, the field sequential system. In this system, one frame period includes a plurality of sub-frame periods (fields). For example, when the light source LS includes red, green, and blue LEDs, one frame period includes red, green, and blue sub-frame periods.

In the red sub-frame period, the red LED is turned on and a voltage corresponding to the red image data is applied to each pixel electrode PE. A red image is thereby displayed. Similarly, in the green and blue sub-frame periods, the green and blue LEDs are turned on and the voltages corresponding to the green and blue image data are applied to the pixel electrodes PE, respectively. Green and blue images are thereby displayed. The red, green, and blue images thus displayed in time division are synthesized with each other and visually recognized as multi-color display images by the user.

Figure 7:
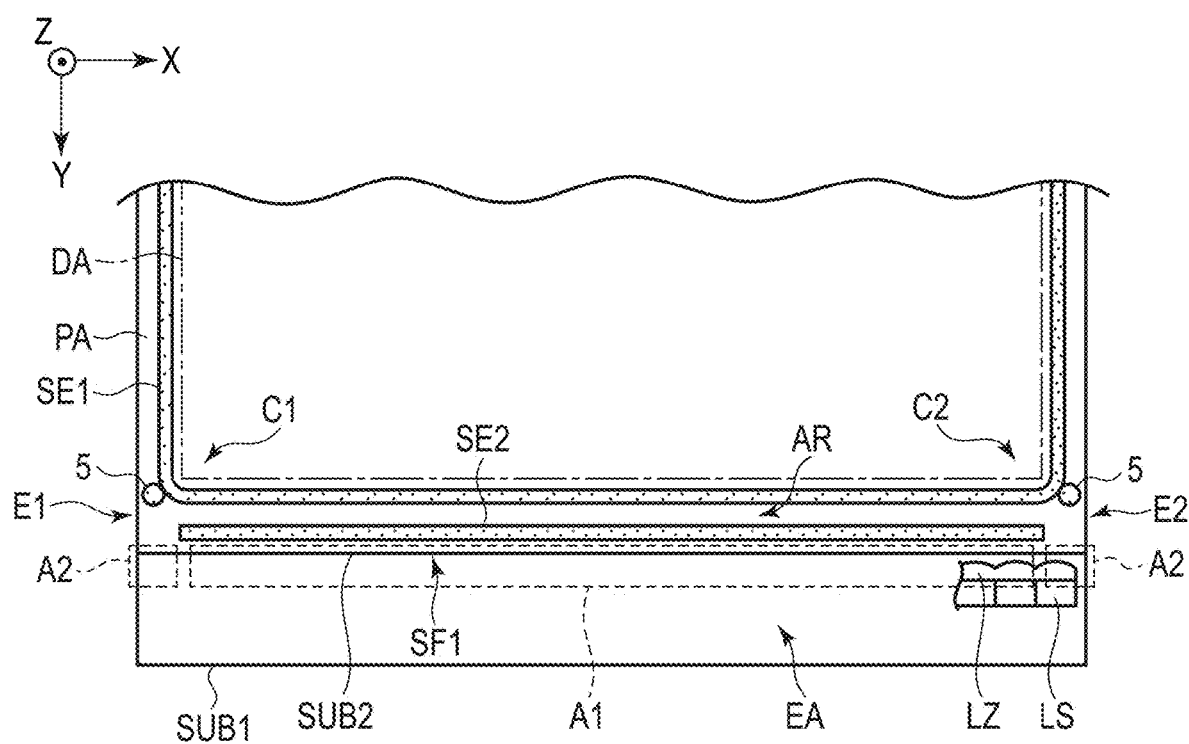
FIG. 7 is a schematic plan view showing a vicinity of an extended region (EA) shown in FIG. 1.

FIG. 7 is a schematic plan view showing a vicinity of an extending region EA shown in FIG. 1. The display device 1 further comprises a second sealing member SE2 arranged between the first substrate SUB1 and the second substrate SUB2, in addition to the above-described first sealing member SE1.

The first sealing member SE1 surrounds the display region DA. The second sealing member SE2 is arranged between the first sealing member SE1 and the side surface SF1 of the second substrate SUB2 in planar view. The second sealing member SE2 has, for example, a linear shape extending in the first direction X. In the example of FIG. 7, a gap is formed between a first end portion E1 (i.e., end portion on the left side of the figure) and a second end portion E2 (i.e., end portion on the right side of the figure) of the second substrate SUB2 in the first direction X, and the second sealing member SE2.

The first sealing member SE1 and the second sealing member SE2 are spaced apart in the second direction Y. An air layer AR (atmosphere layer) is thereby formed between the sealing members SE1 and SE2. An interface between air and the sealing members SE1 and SE2 is increased by the air layer AR, which promotes total reflection of light.

The display device 1 further comprises connection structures 5 that electrically connect the first substrate SUB1 with the second substrate SUB2. In the present embodiment, the connection structures 5 electrically connect the common electrode CE included in the second substrate SUB2 with the lines of the first substrate SUB1. The common voltage supplied from the flexible printed circuit FPC can be thereby applied to the common electrode CE. The connection structures 5 may electrically connect a conductive layer other than the common electrode CE with the lines of the first substrate SUB1. For example, when an electrode for touch sensor is provided on the second substrate SUB2, the connection structures 5 may electrically connect this electrode with the lines of the first substrate SUB1.

In the example of FIG. 7, the connection structures 5 are arranged at a first corner portion C1 (i.e., corner portion on the left side of the figure) and a second corner portion C2 (i.e., corner portion on the right side of the figure) of the second substrate SUB2. These connection structures 5 are located outside the first sealing member SE1. The connection structure 5 may be provided at the other corner portions of the second substrate SUB2 or at locations other than the corner portions.

The side surface SF1 of the second substrate SUB2 has an elongated shape in the first direction X and includes a first region A1 and a second region A2. The second region A2 is located between the first region A1 and the first end portion E1 and between the first region A1 and the second end portion E2, respectively. The first region A1 and the second region A2 have different shapes of the side surface SF1 as described later with reference to FIG. 10 and FIG. 11.

FIG. 8 is a schematic cross-sectional view showing the connection structure 5. The connection structure 5 comprises a pad 51 and a conductive member 52. The pad 51 is provided on the first substrate SUB1 and is opposed to the common electrode CE. The pad 51 is connected to the flexible printed circuit FPC via the lines and a terminal T (see FIG. 1).

For example, the conductive member 52 comprises a structure that at least a plurality of spheres having a conductive surface are contained in a resin material similar to the first sealing member SE1. These spheres are brought into contact with the pad 51 and the common electrode CE, and the pad 51 thereby becomes conductive with the common electrode CE. However, the conductive member 52 may have the other structure as long as it makes the pad 51 and the common electrode CE conductive.

FIG. 9 is a cross-sectional view schematically showing an example of a manufacturing process of the display device 1. This figure shows a state in which the first substrate SUB1 and the second substrate SUB2 are stuck to each other. At the initial stage when these substrates SUB1 and SUB2 are stuck to each other, the second substrate SUB2 includes a portion 21 corresponding to the above-described extending region EA. After that, the portion 21 is removed by cutting with a laser beam or mechanical cutting. The side surface SF1 and the extending region EA are thereby formed.

The side surface SF1 is desirably parallel to the thickness direction (third direction Z) of the second substrate SUB2 from the viewpoint of making the light from the light sources LS incident efficiently. However, the side surface SF1 may not be parallel to the third direction Z due to a non-uniform stress applied when removing the portion 21 or the like.

FIG. 10 is a schematic cross-sectional view showing the first region A1 on the Y-Z plane. The second substrate SUB2 (second base 20) includes a first surface F1 opposed to the first substrate SUB1 (first base 10) and a second surface F2 on a side opposite to the first surface F1.

In the first region A1, the side surface SF1 has a first inclined surface 61. A lower end (i.e., an end part on the first surface F1 side) of the first inclined surface 61 protrudes by first height H1 in the second direction Y beyond an upper end (i.e., an end part on the second surface F2 side). The first inclined surface 61 is inclined at a first angle θ1 with respect to the third direction Z. The first inclined surface 61 having such a shape is considered to be formed due to a factor that the force in the third direction Z is applied to the portion 21 while the first surface F1 is supported by the first substrate SUB1 when the above-described portion 21 is removed.

For example, when the width W0 of the second base 20 in the third direction Z is 0.7 mm, the first inclined surface 61 having the first height H1 of approximately 0.1 to 0.3 mm is generated. In this case, a first angle θ1 is approximately 8 to 23 degrees. When the first inclined surface 61 is formed, a distance D between the upper end of the first inclined surface 61 and a lens LZ becomes at least the first height H1 or more.

FIG. 11 is a schematic cross-sectional view showing the second region A2 on the Y-Z plane. In the second region A2, the side surface SF1 has a second inclined surface 62 and a third inclined surface 63. The third inclined surface 63 is located between the second inclined surface 62 and the first substrate SUB1. A lower end (i.e., an end part on the first surface F1 side) of the second inclined surface 62 further protrudes than the upper end (i.e., an end part on the second surface F2 side) in the second direction Y. The third inclined surface 63 is formed similarly. In the following descriptions, the height at which the lower end of the third inclined surface 63 protrudes in the second direction Y with respect to the upper end of the second inclined surface 62 is referred to as a second height H2.

The second inclined surface 62 is inclined at the second angle θ2 with respect to the third direction Z. The third inclined surface 63 is inclined at a third angle θ3 with respect to the third direction Z. The third angle θ3 is larger than the second angle θ2 (θ2<θ3). In addition, the third angle θ3 is larger than the first angle θ1 (θ1<θ3). For example, the first angle θ1 and the second angle θ2 are 15 degrees or less, and the third angle θ3 is 30 degrees or more.

Thus, the third inclined surface 63 inclined at a large angle is formed in the second region A2. For this reason, the second height H2 becomes larger than the first height H1 (H1<H2). The distance D needs to be at least the second height H2 or more in consideration of the second height H2. As the distance D becomes larger, downsizing of the display device 1 is more hindered. In addition, the incident light efficiency of the side surface SF1 is reduced by each of the inclined surfaces 61 to 63.

FIG. 12 is a graph showing a result of analyzing the incident light efficiency on the side surface SF1. In this analysis, it is assumed that a model M shown in the graph is irradiated with a predetermined amount of light L. The model M is a substrate having a thickness of 0.7 mm. Furthermore, the model M has an inclined surface 60. The width of the inclined surface 60 in the thickness direction of the substrate is W, and the height of the inclined surface 60 protruding from the side surface of the substrate is H. The incident light efficiency was measured while changing the width W between 0.1 and 0.7 for three types of heights H=0.1 mm, 0.2 mm, and 0.3 mm. The incident light efficiency is a relative value with 1.0 when the loss is zero. The incident light efficiency is 0.915 when the inclined surface 60 does not exist.

In the region where the width W is approximately 0.2 mm or less, the incident light efficiency is significantly reduced as the height H is increased. When the width W becomes large, the incident light efficiency does not depend so much on the height H but is strongly influenced by the width W. That is, as the width W becomes larger, the incident light efficiency is reduced.

For example, when the width W is 0.2 mm or less (approximately 30% or less of the thickness of the substrate), reduction in the incident light efficiency can be suppressed to 10% or less if the height H is 0.3 mm or less (approximately 40% or less of the thickness of the substrate). The reduction in the incident light efficiency can be suppressed to 5% or less if the height H is 0.2 mm or less (approximately 30% or less of the thickness of the substrate), and the reduction in the incident light efficiency can be suppressed to several percent if the height H is 0.1 mm or less (approximately 15% or less of the thickness of the substrate).

In addition, the reduction in the incident light efficiency can be suppressed to 20% or less regardless of the height H if the width W is 0.4 mm or less (approximately 60% or less of the thickness of the substrate). If the width W is 0.2 mm or less (approximately 30% or less of the thickness of the substrate), the reduction in the incident light efficiency can be suppressed to 10% or less.

Based on the above analysis, the incident light efficiency of the side surface SF1 is more reduced as the first height H1 of the first inclined surface 61 is larger, in the first region A1 shown in FIG. 10. Furthermore, the incident light efficiency is more reduced in the second region A2 shown in FIG. 11 since two inclined surfaces 62 and 63 exist and the second height H2 is large.

For example, if the second angle θ2 shown in FIG. 11 is made smaller than the first angle θ1 shown in FIG. 10, the incident light efficiency is improved as compared with the case where the second angle θ2 is the first angle θ1 or more, and the difference in incident light efficiency between the first region A1 and the second region A2 can be made smaller.

Furthermore, when the width W3 shown in FIG. 11 is 30% or less of the width W0, similarly to the model M in FIG. 12, the second height H2 is desirably set to 40% or less of the width W0, more desirably to 30% or less, and much more desirably to 15% or less. In addition, the width W3 is desirably set to 60% or less of the width W0, and more desirably to 30% or less.

For example, the angles θ1 to θ3, the heights H1 and H2, and the width W3 can be adjusted depending on the magnitude and direction of the force applied to the second substrate SUB2 and the portion 21 when the portion 21 of the second substrate SUB2 shown in FIG. 9 is removed. In addition, the angles θ1 to θ3, the heights H1 and H2, and the width W3 can be adjusted by adjusting the intensity and irradiation time of laser light when the portion 21 is cut by laser light or can be adjusted depending on the depth and width of the groove formed in a split line when the portion 21 is mechanically cut. A step of polishing the side surface SF1 may be executed after removing the portion 21 and the angles θ1 to θ3, the heights H1 and H2, and the width W3 may be thereby adjusted.

The position of the second region A2 (each of inclined surfaces 62 and 63) can be adjusted by the structure in the vicinity of the side surface SF1. The present inventor has discovered that the second inclined surface 62 and the third inclined surface 63 are easily formed in the vicinity of the connection structure 5 in the structure of the present embodiment. The reason is that the stress is considered to be affected by the pad 51 and the conductive member 52 when the portion 21 of the second substrate SUB2 shown in FIG. 9 is removed. A suitable arrangement example of the connection structure 5 will be described below.

FIG. 13 is an enlarged plan view showing a vicinity of the first corner portion C1 of the second substrate SUB2 in FIG. 7. The first sealing member SE1 includes a curved portion CP in the vicinity of the first corner portion C1. The connection structure 5 is arranged between the curved portion CP and the first end portion E1. The connection structure 5 is located at a position closer to the first end portion E1 than the display region DA, in the first direction X. In addition, the connection structure 5 is located at a position closer to the side surface SF1 than the display region DA, in the second direction Y.

The second region A2 is formed at a position aligned with the connection structure 5 in the second direction Y. The second region A2 is located between the first region A1 and the first end portion E1. That is, the second inclined surface 62 and the third inclined surface 63 are located between the first inclined surface 61 and the end portion of the side surface SF1 in the first direction X.

If the connection structure 5 is provided between a part of the first sealing member SE1 linearly extending in the second region direction Y and the first end portion E1, space for the connection structure 5 needs to be secured between the part and the first end portion E1, and the peripheral region PA can be therefore increased. In contrast, in the example of FIG. 13, the connection structure 5 can be arranged by effectively utilizing the space generated in the vicinity of the curved portion CP.

Even if the incident light efficiency is reduced on the side surface SF1 near the first end portion E1, the influence on the display region DA is small. Therefore, the connection structure 5 is desirably formed at the distance Dx from the first end portion E1 in the first direction X in a range of 5 mm or less, more desirably at the distance Dx in a range of 4 mm or less, and even more desirably at the distance Dx in a range of 3 mm or less. If the connection structure 5 is formed at such a position, the second region A2 can be limited to the vicinity of the first end portion E1.

If a distance Dy between the side surface SF1 and the connection structure 5 in the second region direction Y is large, the peripheral region PA can be increased. Thus, the connection structure 5 is desirably formed at the distance Dy in a range of 6 mm or less, more desirably in a range of 5 mm or less, and even more desirably in a range of 4 mm or less.

Incidentally, the present inventor has found as a result of verification that the incident light efficiency on the side surface SF1 in the vicinity of the first corner portion C1 is extremely reduced when the second sealing member SE2 is extended to the first end portion E1. Therefore, a space is desirably provided between the second seal member SE2 and the first end portion E1. In the example of FIG. 13, a distance longer than or equal to the distance Dx is provided between the second sealing member SE2 and the first end portion E1.

A structure similar to that shown in FIG. 13 can be applied to the vicinity of the second corner portion C2 shown in FIG. 7. From the viewpoint of the incident light efficiency, the ratio of the first region A1 to two second regions A2 is desirably 9:1 or less. That is, the length of one second region A2 (i.e., second inclined surface 62 or third inclined surface 63) in the first direction X is desirably 5% or less of the total length of the side surface SF1. The length of the second region A2 can be adjusted depending on, for example, the position and the size of the connection structure 5.

As described above in the present embodiment, the incident light efficiency of the light from the light sources LS to the side surface SF1 can be improved by controlling the shapes and positions of the second inclined surface 62 and the third inclined surface 63 in the second region A2. As a result, the luminance of the image displayed in the display region DA can be increased. In addition, the above-described various advantages can be obtained from the present embodiment.

Second Embodiment

The second embodiment will now be described. Only the differences from the first embodiment are mentioned here, and the same structure as that of the first embodiment can be applied to each part of the display device 1 according to the present embodiment.

Figure 14:
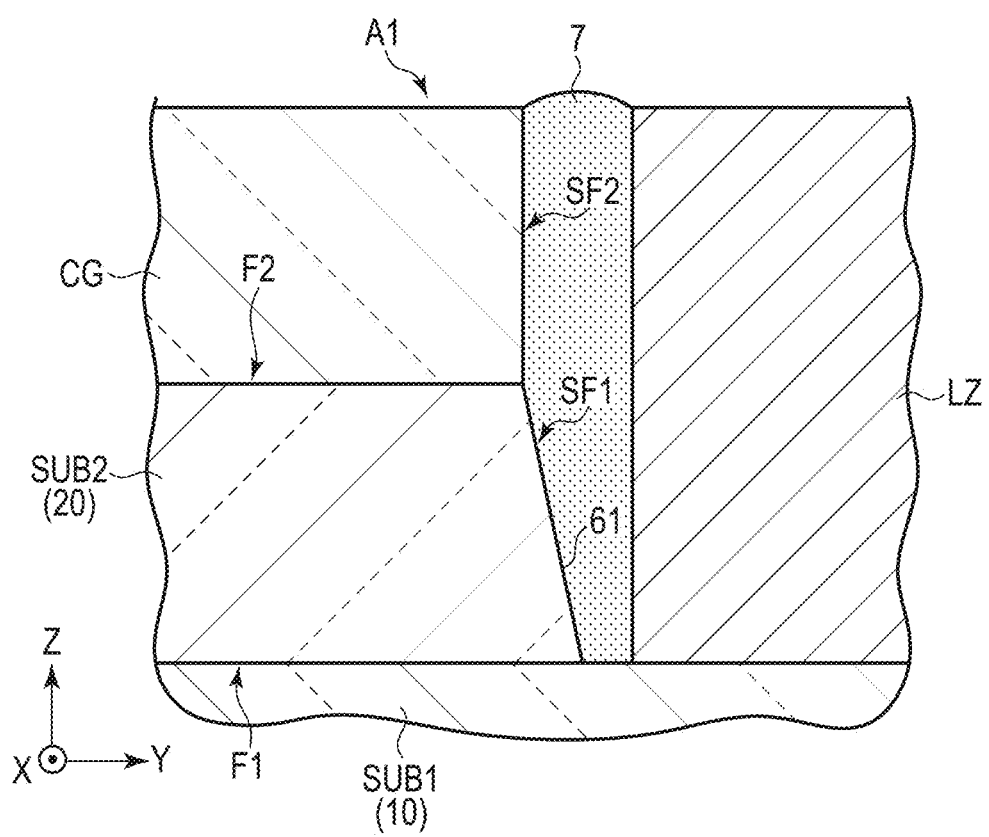
FIG. 14 is a schematic cross-sectional view showing the liquid crystal display device according to a second embodiment.

FIG. 14 is a schematic cross-sectional view showing the vicinity of the first region A1 in the display device 1 according to the present embodiment. In the example of this figure, a gap of the second substrate SUB2 (second base 20) and the cover member CG, and a lens LZ is filled with the resin layer 7. As shown in the figure, for example, the resin layer 7 may protrude from upper surfaces of the cover member CG and the lens LZ or may be recessed from these upper surfaces.

The resin layer 7, the second base 20, and the cover member CG have substantially the same refractive index. Thus, the light from the light sources LS emitted from the lens LZ is not reflected or refracted at the boundary between the resin layer 7 and the side surface SF1 and the boundary between the resin layer 7 and the side surface SF2, but is made desirably incident on the second base 20 and the cover member CG.

The cross section of the first region A1 is shown in FIG. 14, and the resin layer 7 is similarly formed in the second region A2. The reduction in the incident light efficiency due to the first inclined surface 61, the second region inclined surface 62, and the third inclined surface 63 can be thereby suppressed.

Incidentally, when the lens LZ is not provided, the resin layer 7 may be formed between the light sources LS, and the second substrate SUB2 and the cover member CG.

All of the display devices that can be implemented by a person of ordinary skill in the art through arbitrary design changes to the display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A liquid crystal display device comprising:
   a first substrate;
   a second substrate having a first surface opposed to the first substrate; a second surface opposite to the first surface, and a side surface elongated in a first direction; and
   a liquid crystal layer between the first substrate and the second substrate,
   wherein
   the side surface includes a first inclined surface and a second inclined surface on which end portions on the first surface side further protrude in a second direction intersecting the first direction than end portions on the second surface side,
   the first inclined surface is inclined at a first angle to a thickness direction of the second substrate,
   the second inclined surface is inclined at a second angle smaller than the first angle to the thickness direction,
   the side surface further includes a third inclined surface that is located between the second inclined surface and the first substrate and on which an end portion on the first surface side further protrudes in the second direction than an end portion on the second surface side, and
   the third inclined surface is inclined at a third angle larger than the second angle to the thickness direction.

2. The liquid crystal display device of claim 1, further comprising:
   a light source applying light onto the side surface.

3. The liquid crystal display device of claim 2, wherein the first substrate includes an elongated region that is more elongated in the second direction than the side surface, and
   the light source is arranged on the elongated region.

4. The liquid crystal display device of claim 2, further comprising:
   a lens located between the light source and the side surface to control a width in the second direction of the light emitted from the light source.

5. The liquid crystal display device of claim 4, further comprising:
   a resin layer filling a gap between the lens and the side surface.

6. The liquid crystal display device of claim 1, wherein the second inclined surface is located between the first inclined surface and an end portion of the side surface in the first direction.

7. The liquid crystal display device of claim 1, wherein a width in the thickness direction of the third inclined surface is 60% or less of a thickness of the second substrate.

8. The liquid crystal display device of claim 1, wherein the end portion on the first surface side of the first inclined surface protrudes at a first height to the end portion on the second surface side of the first inclined surface,
   the end portion on the first surface side of the third inclined surface protrudes at a second height to the end portion on the second surface side of the second inclined surface; and
   the second height is larger than the first height.

9. The liquid crystal display device of claim 8, wherein a width in the thickness direction of the third inclined surface is 30% or less of a thickness of the second substrate; and
   the second height is 40% or less of the thickness of the second substrate.

10. The liquid crystal display device of claim 1, wherein each of the first angle and the second angle is 15 degrees or less, and
    the third angle is 30 degrees or more.

11. The liquid crystal display device of claim 1, further comprising:
    a connection structure located closer to the side surface than a display region,
    wherein
    the connection structure electrically connects the first substrate with the second substrate, and
    the connection structure and the second inclined surface are arranged in the second direction.

12. The liquid crystal display device of claim 11, wherein the display region includes a plurality of pixels,
    the first substrate comprises pixel electrodes provided in the plurality of pixels, respectively,
    the second substrate comprises a common electrode opposed to the pixel electrodes, and
    the connection structure comprises a pad provided on the first substrate, and a conductive member arranged between the first substrate and the second substrate to electrically connect the pad with the common electrode.

13. The liquid crystal display device of claim 12, further comprising:
a first sealing member arranged between the first substrate and the second substrate and surrounding the display region,
wherein
the conductive member is arranged outside the first sealing member.

14. The liquid crystal display device of claim 13, further comprising:
a linear second sealing member arranged between the first sealing member and the side surface,
wherein
the second sealing member does not exist between the connection structure and the side surface.

15. The liquid crystal display device of claim 14, wherein an air layer is formed between the first sealing member and the second sealing member.

16. The liquid crystal display device of claim 14, wherein the first sealing member includes a curved portion, and the connection structure is located between an end portion in the first direction of the second substrate and the curved portion.

17. The liquid crystal display device of claim 11, wherein the connection structure is located more closely to an end portion in the first direction of the second substrate than the display region in the first direction.

18. The liquid crystal display device of claim 2, further comprising:
a transparent cover member opposed to the second surface,
wherein
the light source applies light to a side surface of the cover member.

19. A liquid crystal display device comprising:
a first substrate;
a second substrate having a first surface opposed to the first substrate, a second surface opposite to the first surface, and a side surface elongated in a first direction; and
a liquid crystal layer between the first substrate and the second substrate,
wherein
the side surface includes a first inclined surface and a second inclined surface on which end portions on the first surface side further protrude in a second direction intersecting the first direction than end portions on the second surface side,
the first inclined surface is inclined at a first angle to a thickness direction of the second substrate,
the second inclined surface is inclined at a second angle smaller than the first angle to the thickness direction, and
a length in the first direction of the second inclined surface is 5% or less of a full length of the side surface.

* * * * *